(12) United States Patent
Arthur et al.

(10) Patent No.: US 8,244,806 B2
(45) Date of Patent: Aug. 14, 2012

(54) SYSTEM AND METHOD FOR EFFECTING SIMULTANEOUS CONTROL OF REMOTE COMPUTERS

(75) Inventors: Kieran Arthur, Navan (IE); Mark Ward, Dundalk (IE); Dermot Hannan, Dundalk (IE)

(73) Assignee: Brandt Technologies Limited, Dundalk (IE)

( * ) Notice: Subject to any disclaimer, the term of this patent is extended or adjusted under 35 U.S.C. 154(b) by 681 days.

(21) Appl. No.: 12/162,327

(22) PCT Filed: Jan. 23, 2007

(86) PCT No.: PCT/EP2007/050671
§ 371 (c)(1),
(2), (4) Date: May 1, 2009

(87) PCT Pub. No.: WO2007/085603
PCT Pub. Date: Aug. 2, 2007

(65) Prior Publication Data
US 2009/0307600 A1    Dec. 10, 2009

(30) Foreign Application Priority Data
Jan. 25, 2006 (EP) .................................. 06100863

(51) Int. Cl.
*G06F 15/16* (2006.01)
*G06F 15/177* (2006.01)

(52) U.S. Cl. .................. 709/204; 709/218; 715/740
(58) Field of Classification Search .......... 709/201–205, 709/217–234; 715/740–753
See application file for complete search history.

(56) References Cited

U.S. PATENT DOCUMENTS

| 5,819,038 A | 10/1998 | Carleton et al. |
| 2004/0027375 A1* | 2/2004 | Ellis et al. .................... 345/753 |

FOREIGN PATENT DOCUMENTS

| WO | 99/10801 A1 | 3/1999 |
| WO | 99/63430 A1 | 12/1999 |
| WO | 01/97014 A2 | 12/2001 |

OTHER PUBLICATIONS

IBM Technical Disclosure Bulletin "Remote Desktop Environments Reflected in Local Desktop Windows," IBM Corp, New York, US, vol. 36, No. 3, pp. 421-425, (Mar. 1, 1993).

* cited by examiner

*Primary Examiner* — Yasin Barqadle
(74) *Attorney, Agent, or Firm* — HolzerIPLaw, PC (57) ABSTRACT

A system and methodology for controlling multiple devices simultaneously from one control device. The control device is provided with a display having a plurality of windows, each having a visual representation related to the activity of the multiple devices. By relaying commands effected at the control device through an intermediary server, it is possible to simultaneously effect a corresponding processing of the same commands at each of the multiple devices. On effecting a command the multiple devices relay back, through the server, an image representative of the result of the processing of that command to the control device for display.

23 Claims, 5 Drawing Sheets

SYSTEM AND METHOD FOR EFFECTING SIMULTANEOUS CONTROL OF REMOTE COMPUTERS

FIELD OF THE INVENTION

The present invention relates to networked computers and in particular to a system and method for effecting control of remote computers in a networked computer environment. The system more particularly relates to a methodology that can be utilised in the running or execution of the same computer application on one or more remote computers concurrently so as to enable an evaluation and testing of the performance of that program on each of the remote computers.

BACKGROUND

Within a networked architecture it is known that individual computers can communicate with one another using distinct network protocols such as TCP/IP. Using these protocols it is possible for a person running a software application on a first computer to utilise data that is stored on another computer such as a file server or the like.

It is also known in the art to provide software applications that enable a remote user to effectively take control of another computer so as to run computer applications that reside on the remote computer from their own local computer. Such applications include that provided by Microsoft™ under their Remote Desktop brand and an open source software application called VNC (Virtual Network Computing). These applications make it possible to view and fully-interact with one computer from any other computer or mobile device anywhere on the Internet. VNC software is a cross-platform application which is advantageous in that it allows remote control between different types of computer, but has the restriction that only that the end user can only control one remote machine at a time; for each end user it is a 1-1 arrangement.

AnyplaceControl™ is a product that allows the user to connect to multiple machines simultaneously. However, although the user can connect to the multiple machines, he is restricted in that he can control one machine at a time, but cannot control multiple machines by passing the same action to many machines simultaneously. Therefore, although it is different to VNC in that it enables a 1-many connection, it does not allow 1-many control.

Uses of these remote desktop software applications include system administration, IT support and helpdesk applications where the technical support provider can log into the computer that is causing the difficulty and interrogate it without having to be physically present at the computer. These systems allow several connections to the same desktop thereby enabling collaborative or shared working, but with only one computer acting as the controller at a time. The remote desktop application can also be used for training purposes, whereby the instructor can view a single pupil's machine or several pupils' machines, however heretofore simultaneous control of multiple machines by the teacher is not possible.

Such control of a remote computer by a local computer can be used in the realm of software testing. Software testing involves the operation of a system or application under controlled conditions and an evaluation of the results. The controlled conditions should include both normal and abnormal conditions. Testing should intentionally attempt to make things go wrong to determine if things happen when they should happen and more importantly if things happen when they should not happen. The requirements for good software testing are reasonably well defined to ensure that it is a process of quality control using group of well defined methods and evaluation criteria, together with guidelines for their use, to ensure that the software products or modules are of sufficiently high quality. The testing that is required for good software testing has to be rigorous and as such it will be apparent that it adds to the cost of development. It can be applied to all or some of the following activities:

Robustness, Reliability, and Security Testing
Ensuring that the software provides fault-free service under specific hardware and software environments.
Logo Compliance and Certification Testing
Ensuring the application under test meets standards to compliant with a standard such as Sun "JavaVerified" or Microsoft "Designed for Windows".
Compatibility Testing
Application and hardware compatibility testing for new versions of platform and system software.
Interoperability/Integration Testing
Ensuring that various components of the system work well together in selected scenarios.
Globalisation/Localisation
Testing to ensure that a product meets well defined globalisation standards.

As the application of software testing is pervasive within a computer software architecture, it would therefore be advantageous if certain portions of the test strategy could be automated. Despite the benefits in cost and time, automated testing to date has not been perfect. Some examples have been deployed in what is called user interface automated testing where one or more of the following actions are used:

Capturing controls,
Manipulating controls,
Acquiring data from controls.

In capturing controls it is necessary to know what you are looking for. For example in an Windows™ environment there are three types of controls:

1. Standard Windows™ controls—buttons, text boxes, custom controls,
2. Custom owner drawn controls are controls that have the functionality of standard controls but also have custom functionality added by the developer. Windows provides support for "owner drawn" controls and menus by allowing the developer to override methods in the base classes of menus or dialogs and implement new appearance and behaviour of the control or menu.
3. Painted controls—controls that have the functionality of standard controls, but also have functionality added by the developer. In addition to the "Custom owner draw controls", the painted controls take responsibility for processing windows messages, such as WM_PAINT, themselves.

Current automated testing tools come in three general categories, each with different operating modes, namely:

Simple capture-record and playback,
Object orientated automation,
Image-based component discovery.

It will be appreciated that each of these techniques has different architecture and different characteristics. The Simple Capture Record/Playback has the advantage of being simple, while it suffers the disadvantages of being sensitive to graphical user interface changes, sensitive to application position on the screen and having playback synchronisation issues. The programmatic approach can adjust to changes in the application user interface more easily than the former approach and can handle playback synchronisation issues better. However, there is a skills issue where the tester has also to be a developer. The issue of test case script development brings with it version control and change management, much like a software development process. The third approach utilises images that are generated and utilised during the running of the program being tested. Images are taken of regions around the mouse at the time of some mouse interaction. This image is then stored. At a later time the stored image is used to identify where the mouse action should be taken either during playback of a test script or where the action should be taken on some other system.

An example of an available product that utilises image based component discovery in an automated testing context is a product provided by Redstone™ under their Eggplant™ brand. Eggplant™ is a software testing tool that utilises VNC (discussed above) which is specifically directed towards testing what a human will experience when using a software application. The Eggplant™ software operates by separating the issues of finding a region of interest and finding the area where the user input is to be applied.

Furthermore, Eggplant does not recognise objects in the sense described for Object Oriented automated testing. The Eggplant "objects" are screenshots of identifying features, they are not objects in the sense of widgets, with defined data and behaviour. The Eggplant "objects" are defined by the user, using the movable and resizable window that defines the region of interest.

There is therefore a need to provide a system and methodology that enables a control of a plurality of computing devices through the desktop of a first computing device, with desktops of the controlled devices being displayed on a display associated with the first device. There is a further need for an image based discovery testing application that can be easily rolled out over multiple computers and provides a robust and secure testing architecture.

SUMMARY

These and other needs are addressed by a system and method in accordance with the present invention that provides for an automation of testing or remote management of computers within a networked environment. A network architecture in accordance with the invention enables a 1-many connection and control between a first computing device and a plurality of other computing devices. The architecture enables this 1-many connection by provision of a client target module which is executable on one or more systems under test, each of these being defined as target devices, a client viewer module which is executable on a local computer and allows a user to view and control each of the systems under test on a local desktop—referred to as a client device and a dispatch server module which provides for an interface between each of the client viewer modules and client target modules—referred to as a server device. The dispatch server module is a server application executable on a computer and configured to mediate all interactions between the user and each of the systems under test. Interfaceable with the dispatch server module may be provided an interpretation server module which may be configured to effect one or more of a plurality of possible tasks including for example image processing, image segmentation, image interpretation, database lookup and generation of generic information, such as XML descriptions of the image being interrogated.

Using a network architecture in accordance with the invention enables a user to perform automated testing or remote management on one or more remote computers simultaneously; the interface provided between the user and the systems under test enables a connection to and control of each of the systems under test concurrently. It will be appreciated that the word computer is used in its general sense to encompass any computing device or electronic device running an operating system and that it is intended to encompass within the present invention any device such as for example personal digital assistants (PDAs), mobile telephones etc., as well as a conventional personal computer or laptop.

Accordingly the invention provides a system as detailed in claim 1 with advantageous embodiments provided in the dependent claims. The invention also provides a method in accordance with claim 23.

These and other features will be better understood with reference to the following drawings.

BRIEF DESCRIPTION OF THE DRAWINGS

FIGS. 4*a* to 4*c* illustrate socket communications between components of the present invention.

DETAILED DESCRIPTION OF THE DRAWINGS

Figure 1:
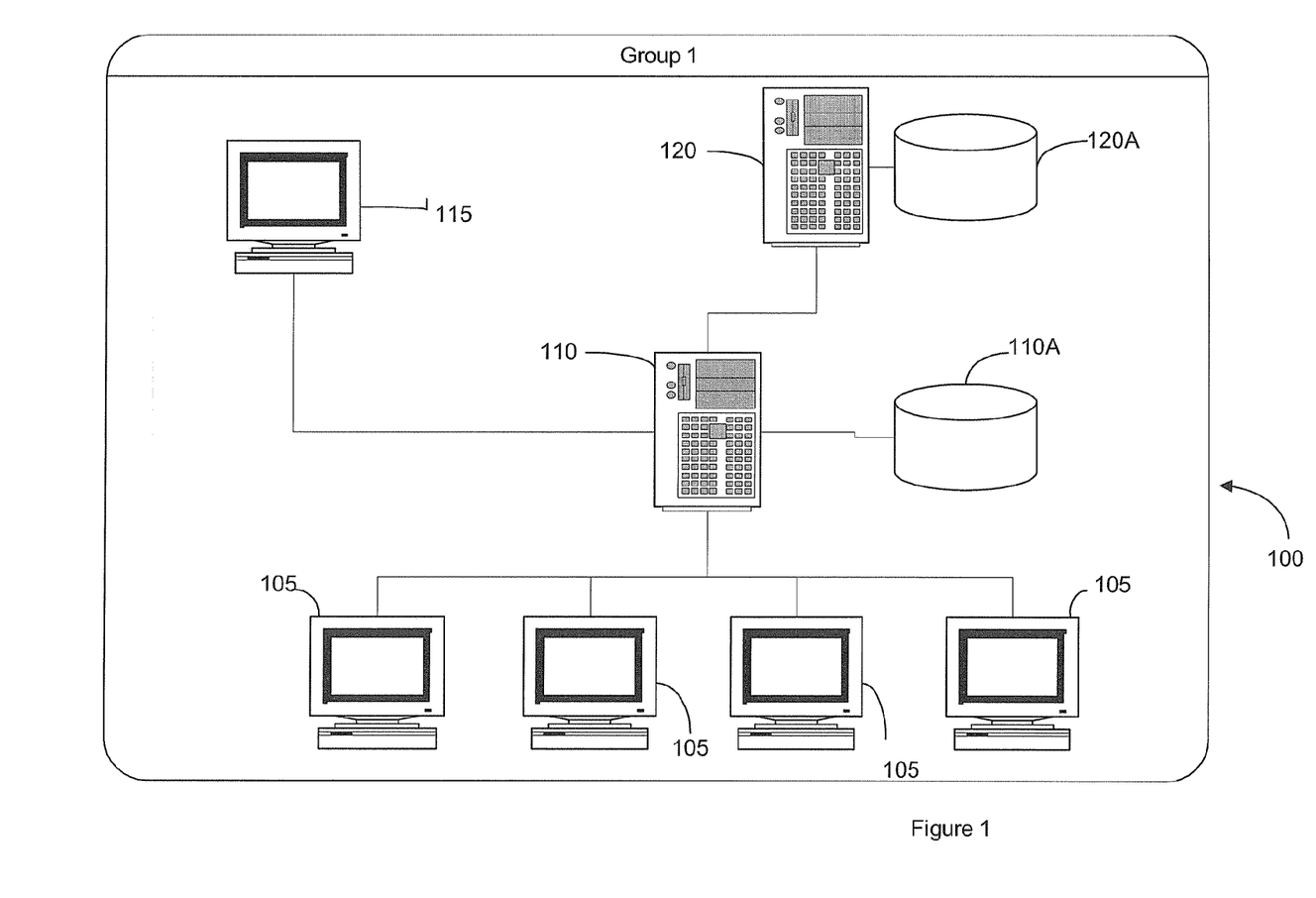
FIG. 1 shows in schematic form, a network architecture in accordance with the teachings of the invention.

A system in accordance with the teachings of the invention will now be described with reference to the following nomenclature which is provided for ease of explanation and no inference is to be taken from the naming protocol used. As shown in FIG. 1, a system 100 in accordance with the teaching of the invention has several components:

One or more Shadow Client Targets (SCT) 105
Shadow Dispatch Server (SDS) 110 coupled to a data storage device 110A
Shadow Client Viewer (SCV) 115
Shadow Interpretation Server (SIS) 120, coupled to a data storage device 120A

The SIS may be considered an optional feature to the architecture as it enables further processing routines and functionality to be achieved within the 1-many connection.

In the following sections we will go through each of the individual components separately.

Shadow Client Target (SCT) 105

The SCT is a software module that is operable on the system under test or machine that the user desires to be controlled remotely. It is provided as a multi-threaded piece of software running on the system under test and performs the following functional steps:

SCT opens a port at which to listen
SCT creates a socket for data transfer
SCT actively tries to connect with a Shadow Dispatch Server (SDS).

The SCT may be run or executed in one of two modes. The SCT can be run as a regular executable file. Alternatively, it may be installed on the operating system as a service that starts up automatically whenever the SCT machine is restarted.

If the SCT is running as a regular executable file then the SCT presents the user with a dialog box prompting the user to specify the SDS from a list of possible SDS's. Alternatively, if the SCT is running as an operating system service then the SCT will use configuration data in order to determine which SDS to which to connect. The configurable data is set through for example an initialization file, an "INI" file, that the user may edit.

During operation of the system of the invention, the SCT receives from the SDS packets containing data specifying command inputs such as mouse and keystroke information. The SCT generates and sends a sequence of graphic files such as bitmaps to the SDS which are screenshots of the machine in its current state. The SCT performs an action resultant from the command inputs and then provides a graphic file illustrating the result of that command input, in addition to the sequence of graphics being provided regularly, as evidence of the result of that action. In this way it will be understood that what the SCT sends are periodic regular interval screenshots of the current display at that SCT and, when that display changes as a result of some command, a further additional update showing how the display has changed.

It will be understood that a system in accordance with the present invention may be deployed across a plurality of different machines and operating systems, yet at any one particular instance that only one subset of the machines is being utilised. The SCT may connect to a single SDS which is a member of the set of available SDS's. A SCT may only connect to one SDS in an active mode, but may be connected to many SDS's concurrently.

Figure 2:
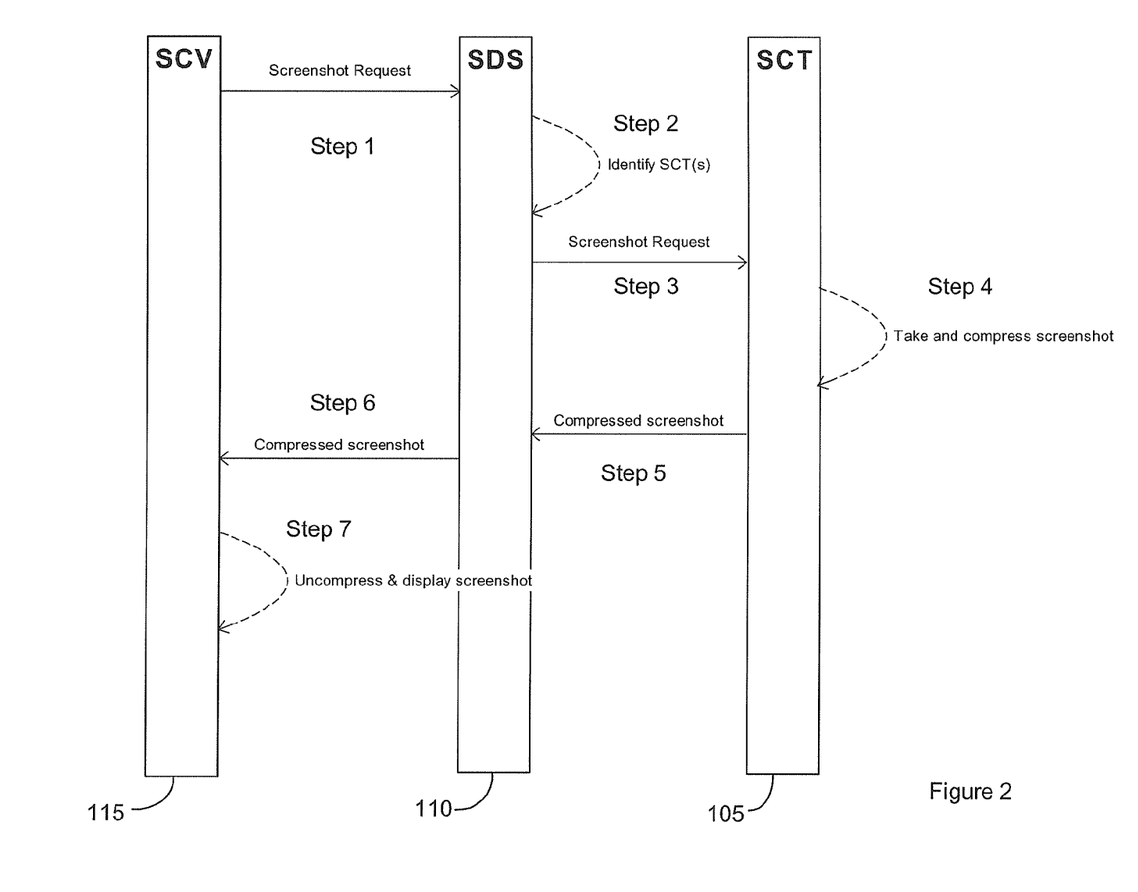
FIG. 2 shows an example of the processing implemented across the network architecture in accordance with the invention.

During operation of the system, the SCT receives input data from the SDS, through the data socket. It will be understood that the communication between the individual components of the system is through network protocols such as TCP/IP. These data may comprise one or more (but not limited to) of:

Keyboard input and supporting data
Mouse/Pointer input and supporting data
Request for information about the SCT hardware setup
Request for a screenshot to be taken
Request to retrieve clipboard contents
Request to insert data into clipboard The keyboard or mouse actions are sent to the operating system queue. If the input also included a request that a screenshot be taken, that is, if the SCV is in recording mode, then the SCT waits for the operating system to process the input before it takes the screenshot. FIG. 2 shows an example of such a screen shot request. In step 1, a request is generated at the SCV 115. This request is received at the SDS where the appropriate SCTs are identified (step 2). The request is then relayed to the appropriate SCTs (Step 3), where on receipt it is processed and the relevant screen shot taken (Step 4). This is compressed locally at the SCT and relayed back to the SDS (Step 5). On receipt, it is then relayed by the SDS to the SCV, still in compressed format (Step 6). On receipt at the SCV it is uncompressed and displayed in the relevant window for that SCT on the display of the SCV (step 7).

The SIS contains the widget finding functionality. If the supporting information that accompanies a user input request indicates that a widget finding routine should be used then the SIS will perform the widget finding routine, and pass the necessary information to the SCT via the SDS, which will then apply the user input in an appropriate place.

If the SCT clipboard contents are modified then a message is sent to the SDS that represents this event. The message also contains the clipboard contents and any necessary supporting information.

It will be understood that the performance of tasks that are initially effected elsewhere in the architecture is only one portion of a 1-many connection. It is also necessary for confirmation of these tasks to be returned to the controlling device, the SCV. The SCT therefore is required to output a series of data outputs corresponding to the activity performed locally on the SCT device. The SCT achieves this by taking one or more screen shots which may then be compressed using known compression libraries such as ZLIB or the like. The compressed file is sent through the data socket to the SDS. The end user, i.e. the person controlling the SCV, can configure the frame rate—i.e. the number of screenshots taken per second, which may be set to a default rate of for example 5/sec.

The SCT sends back responses based on the received request to process user input. These responses can include supporting information such as the mouse position of where the action was applied. Further, this data may include a compressed screenshot representing the screen state subsequent to the SCT applying the action.

If the SIS widget finding routine finds more than one potential result then the SIS will send back a request indicating that further supporting information is needed.

The SCT can also send back a message containing information about its hardware setup and/or its clipboard contents.

Shadow Dispatch Server (SDS) 110

The Shadow Dispatch Server is a multi-threaded piece of software providing an interface between one or more SCTs and an SCV and performs the following functional steps:

On execution it waits for connections from SCT's and SCV's.
SDS instantiates a socket and thread for each SCT.
SDS instantiates a socket and thread for each SCV.
SDS instantiates other threads for internal tasks.

The SDS connects to a subset of the available machines, which may be many but at least 1. As mentioned above, with reference to the SCT, some deployments of the system of the present invention may involve installation on a plurality of machines & operating systems, yet at any one instant of operation, there may exist some machines that are not connected to any SDS.

The SDS has input and output communications with both SCV's and SCT's, using network protocols such as TCP/IP for data transfer. In essence it provides the interface between the SCV and the SCT. While it is possible that the SDS makes connection with many SCV's it is the case that only 1 of the SCVs is in full control of any one particular SCT. The other SCV's that are connected via the SDS to this SCT can only observe and take a "feed" of screenshots from the SDS for display purposes only.

Each SDS thread devoted to a single SCT does the following:

Supports a connection to the SCT. The SCT in fact makes a connection to the SDS.
Receives requests from the SCV.
Based on the SCV request message content the SDS may decide to send this request to the SIS for processing. If this is the case then the current thread will wait for a response from the SIS before processing any other requests from the SCV associated with this thread.
The request is forwarded to the appropriate targets. It should be noted that the same one request from a SCV may be sent to many SCT's. This one to many scenario occurs when the SCV is in controller mode and is controlling many machines simultaneously.
Receives responses from the SCT
Based on the response from the SCT the SDS may forward the response to a SIS for further processing.
If the SCV is in recording mode then the SDS will save the response to its data storage device. The data is stored in electronic format in such a way that it is easily retrievable and can be used for playback purposes at a later stage.

The SDS may decide to forward the SCT response to the appropriate SCV.

Receives data from the SCV—in the form of XML describing mouse and keyboard movements.

Relays the XML data to the SCT.

Relays the compressed screenshot data to the SCV.

As an interface module, it will be appreciated that the SDS receives and transmits a plurality of inputs and outputs, both from the SCT and the SCV.

The following is a list of the types of inputs typical to the SDS:

SCV request to take a screenshot of the associated SCT.
SCV request for SCT hardware and software information.
SCV request to process user input plus supporting information.
SCV message indicating that the current remote machine is now the controller.
SCV message indicating that the current remote machine's recording state has changed.
SCV message indicating that the current remote machine's playback state has changed.
SCV request to return a list of all connected SCT's.
SCV request to close this connection.
SCV message indicating that the clipboard content of this SCV has changed plus clipboard information.
SCV request to take a manual screenshot.
SIS response.
SCT compressed screenshot and supporting information.
SCT hardware and software information.
SCT message indicating that the clipboard content of this SCT has changed plus clipboard information.
SCT user input response and supporting information.
SCT manual screenshot response.
SCT request to close this connection.

With regard to outputs, the SDS will save recorded data to its data source—thereby providing a cache functionality. This data is stored in electronic form and can be used at a later stage for playback purposes. Typical data outputs from the SDS include:

Request to SCT to take a screenshot of the associated SCT.
Request to SCT for SCT hardware and software information.
Request to SCT to process user input plus supporting information.
Message to SCT indicating that the clipboard content of this SCV has changed plus clipboard information.
Request to SCT to take a manual screenshot.
Request to SIS to analyse data.
SCT compressed screenshot and supporting information.
SCT hardware and software information.
SCT message indicating that the clipboard content of this SCT has changed plus clipboard information.
SCT user input response and supporting information.
SCT manual screenshot response.
SCT request to close this connection.

Shadow Client Viewer (SCV) 115

Figure 3:
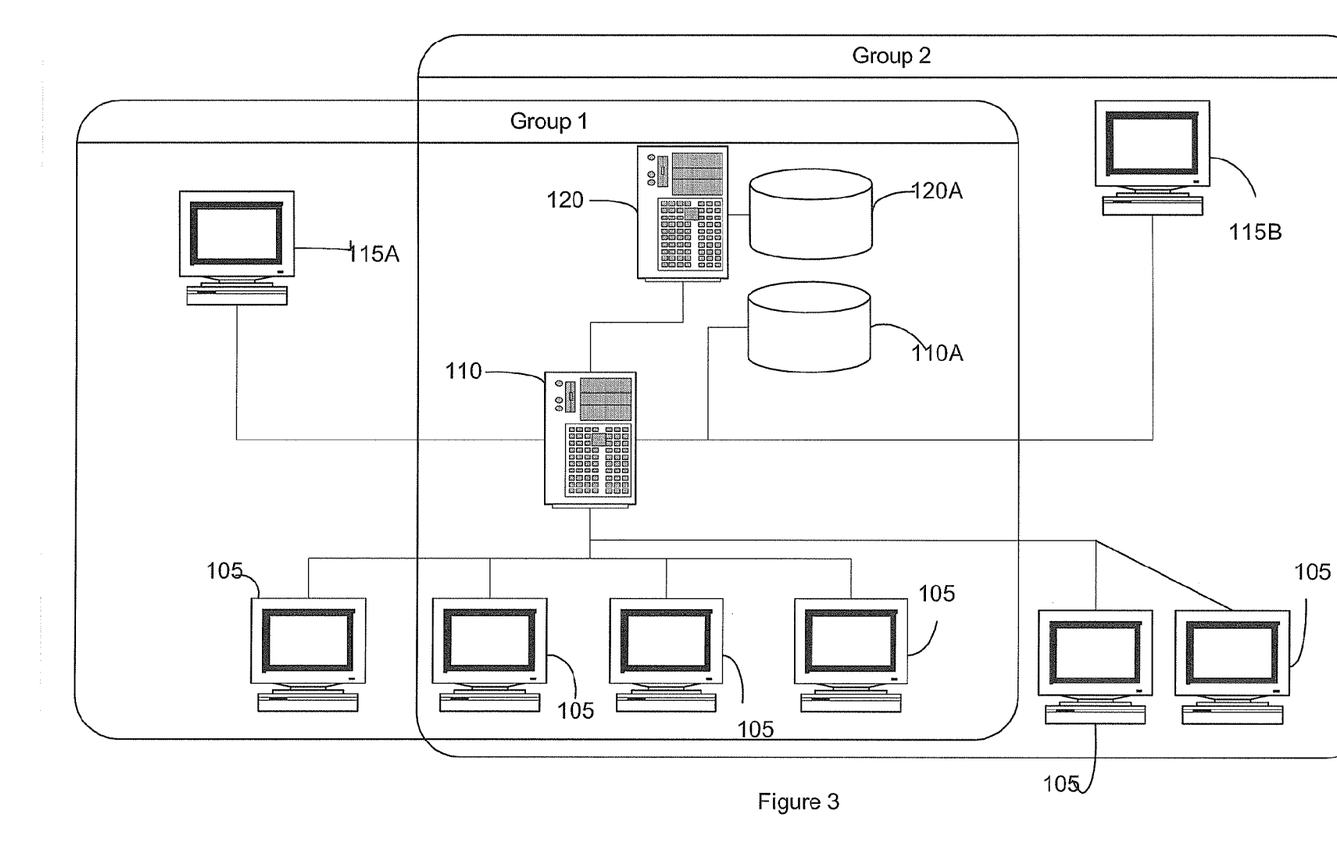
FIG. 3 shows a modification of the architecture of FIG. 1 to include an additional client viewer device.

The SCV is also a multithreaded application. The SCV connects to a single SDS, and may do so in a viewing capacity or in an active capacity. A SCV may connect to many SDSs, although only one will be in active mode. In an active capacity, the SCV controls the operation of the SCT. In a viewing capacity, an SCV simply receives display information from each connected SCT and displays each SCT—no user input is sent to by a viewing SCV to any SCT. FIG. 1 shows an example of a one group configuration where one SCV 115 is connected to one SDS 110. The SCTs 105 are all under the control of the SCV and the SCV is in active mode in this configuration. In the two group example of FIG. 3, two SCVs 115A, 115B are connected to one SDS 110. In this configuration one of the SCVs, for example SCV 115A, is in control of all of the machines of its group. In Group 1 the SCV associated with this configuration is in control of all of the machines in Group 1. There are three SCTs that are members of both groups. In this example, the SCV associated with Group 2, SCV 115B, can only view the SCT in Group 1 and is not in control of it, but is in full control of the other SCTs in Group 2.

For our purposes, a "relevant" SCT, in the context of being connected to a SCV, is one for which the SCV has control over the SCT in an active fashion.

Figure 4A:
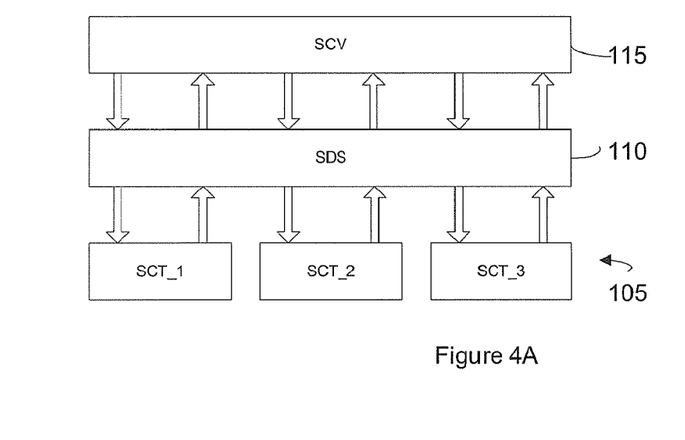
Figure 4B:
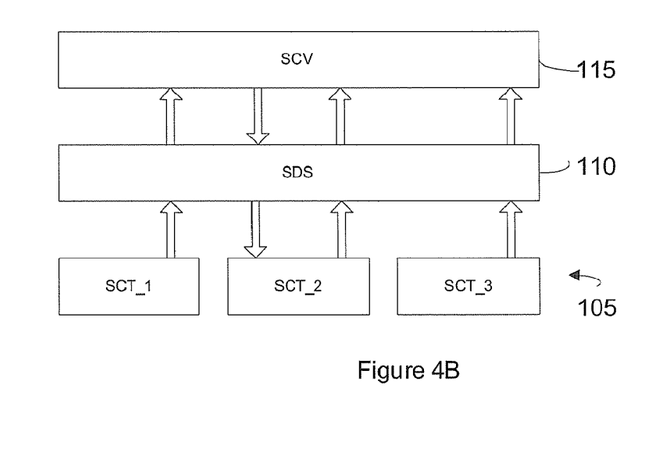
Figure 4C:
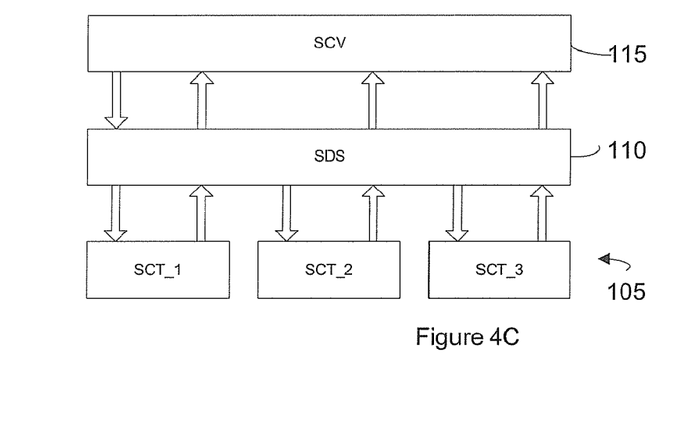

FIG. 4 shows the communications sockets for data to and from the SCV and SDS. It also shows the communication sockets between the SDS and each individual SCT. The SCV has a single thread for each socket connection to the SDS corresponding with a SCT. It is through these sockets that the SCV communicates with each SCT, via the SDS. FIG. 4A shows the communication sockets that are present, whereas FIG. 4B shows the data flow for sockets when a first SCT, SCT_1, is a controller and a second SCT, SCT_2, is being interacted with directly through the SCV, and not though the controller. FIG. 4C shows the data flow for the sockets when SCT_1 is a controller.

In order to effectively control each of the SCTs, it is important for the user to be cognisant of the activities on each of the target machines. The system of the invention achieves this by providing a window display on the SCV of each of the SCTs to which it is connected. An example is shown in the screen shot of FIG. 5, where it is evident that the SCV has a window for each SCT 505, 510, that has been selected. It is also possible to provide a second window 505A, 510A, a loupe window for each SCT, where the area of activity on each of the SCTs is enlarged. The mouse and keyboard information for each window is collected using standard event listeners for these types of events.

Within the SCV a controller window corresponding to a particular SCT may be specified using a menu option or a short cut key. The SDS is provided with this information by the SCV. This controller machine window in the SCV passes its events to the SDS through the data sockets. The SDS passes the events to the SCT corresponding to the controller window, but it also passes these same events to each (non-controlling) SCT that is connected to it. The SDS does not pass all of the events to all of the SCTs connected it, as some may not be relevant to the specific SCV, for example SCV 115B in FIG. 3 does not need to see activities relevant to Group 1. In this situation the user has remote control over all relevant SCTs (machines) simultaneously through effecting actions on one window alone in the SCV.

In the case that there is a controller window set and the user moves the mouse over another window in the SCV, a different situation to the above pertains. In this case event data are passed through the socket pertinent to the SCT, to the SDS and from there to the SCT. However in this case the SDS does not relay the events to all relevant (in the sense described in the previous paragraph) SCTs connected to it. In this way the user has remote control of one single machine, see FIG. 4B.

The SDS has two data sockets per (relevant) SCT. Each data socket is uni-directional and serves different purposes. One socket contains data messages such as; requests for screenshots, mouse and keyboard data, closing messages and other text based data. The other socket contains data coming from the SCT such as messages and compressed screenshots.

Shadow Interpretation Server (SIS) 120

As discussed above, some deployments of the invention will be sufficient using only a SCV and an SDS through which the SCV interfaces with one or more SCTs. Where additional functionality is required in the interaction, the invention provides an interpretation server, the Shadow Interpretation Server (SIS) 120. The SIS connects to the SDS. It is a multi-threaded application. The purpose of the SIS is to perform digital image processing and database lookup operations.

The functionality of the SIS includes the following:

Image segmentation using digital image processing techniques such as, but not limited to, threshold segmentation, edge based segmentation, region growing, non-linear scale space linking and/or others. The regions into which the image is segmented contain the feature on which the user clicked. We now have a region of a certain size and boundary from which we can extract other information.

Feature vector extraction—using the specified region of the image, techniques such as gray scale and colour histograms, n'th order moments and/or wavelets are applied to get a measure that describes an image region. This measure may be expressed as a vector quantity so that mathematical techniques may be used on it. Such feature vectors may be required for several contiguous segments.

Object recognition using the feature vectors. Identification of an object is governed by using fuzzy logic, neural networks, support vector machines and/or case based reasoning applied to the group of feature vectors. Reference objects may be stored in a database format against which to compare the unknown feature.

One of the functions of the SIS is, given a coordinate in an image, to find the object associated with that point. The SIS does this in the following manner:

The image is segmented—using a digital image processing segmentation technique.

A feature vector is extracted for the segments (regions) around the mouse, such as, but not limited to, a histogram or a moment measure.

These feature vectors define the "object" in the image from which the coordinate was specified.

These feature vectors are compared to reference feature vectors in order to assess similarity, using a distance metric, such as, but not limited to; the Euclidean metric, the Manhattan metric or Earthmover distance.

Reference feature vectors are stored in a database. The database having been manually constructed to contain such data as might be necessary when examining a set of screenshots.

Reference feature vectors are retrieved using SQL. Reference feature vectors have an identification with "objects" that might be encountered when examining a set of screenshots, such as "menu", "toolbar".

The identification of an object is made by providing a set of candidate objects that have feature vectors most closely resembling (similarity being used in the sense defined above) those feature vectors extracted from the source image. For most images this list of candidate object identifications will be of length 1. If the list is longer than 1, then the process has not made a unique object identification. In order to make the identification unique, we will either seek user intervention to decide which is the correct identification or increase the number of feature vectors used and repeat the process until a unique identification is made.

The function being described above is prototyped by the following:

Object findwidget(point p) {return Object widget}

Another function of the SIS is to identify a point on an image given an object. The process is as follows:

The feature vector of the object we wish to find is found through querying a database—this will be referred to as the query feature.

The image is segmented—using a digital image processing segmentation technique.

Feature vectors are extracted for all of the segments (regions) in the image, such as, but not limited to; histograms or moment measures. These feature vectors describe a quality of the image in a particular area. Image areas with similar feature vectors are expected to be similar and have similar content.

Each element of the list of feature vectors is compared to the query feature vector of the object we wish to identify. In order to assess similarity of the feature vectors to the query feature, it is possible to use a distance metric, such as, but not limited to; the Euclidean metric, the Manhattan metric or Earthmover distance.

When the closest match feature is found, the coordinates of the centre of gravity of that segment are returned.

The function being described above is prototyped by the following:

point findCoordinates(Object widget) {return point p}

EXAMPLES OF OPERATION

By enabling a 1-many interaction, the system of the present invention may be deployed in a number of different fashions. An example of the application of the methodology of the present invention in a first mode, that of mimic mode, follows. This specific flow sequence is illustrative of the example of a single client target and requires 1 system under test with the client target module executing thereon, one system having the client viewer module executing thereon and one server having the dispatch module executing thereon. Each of the modules is provided on distinct hardware machines and communicates with one another using TCP/IP.

Figure 5:
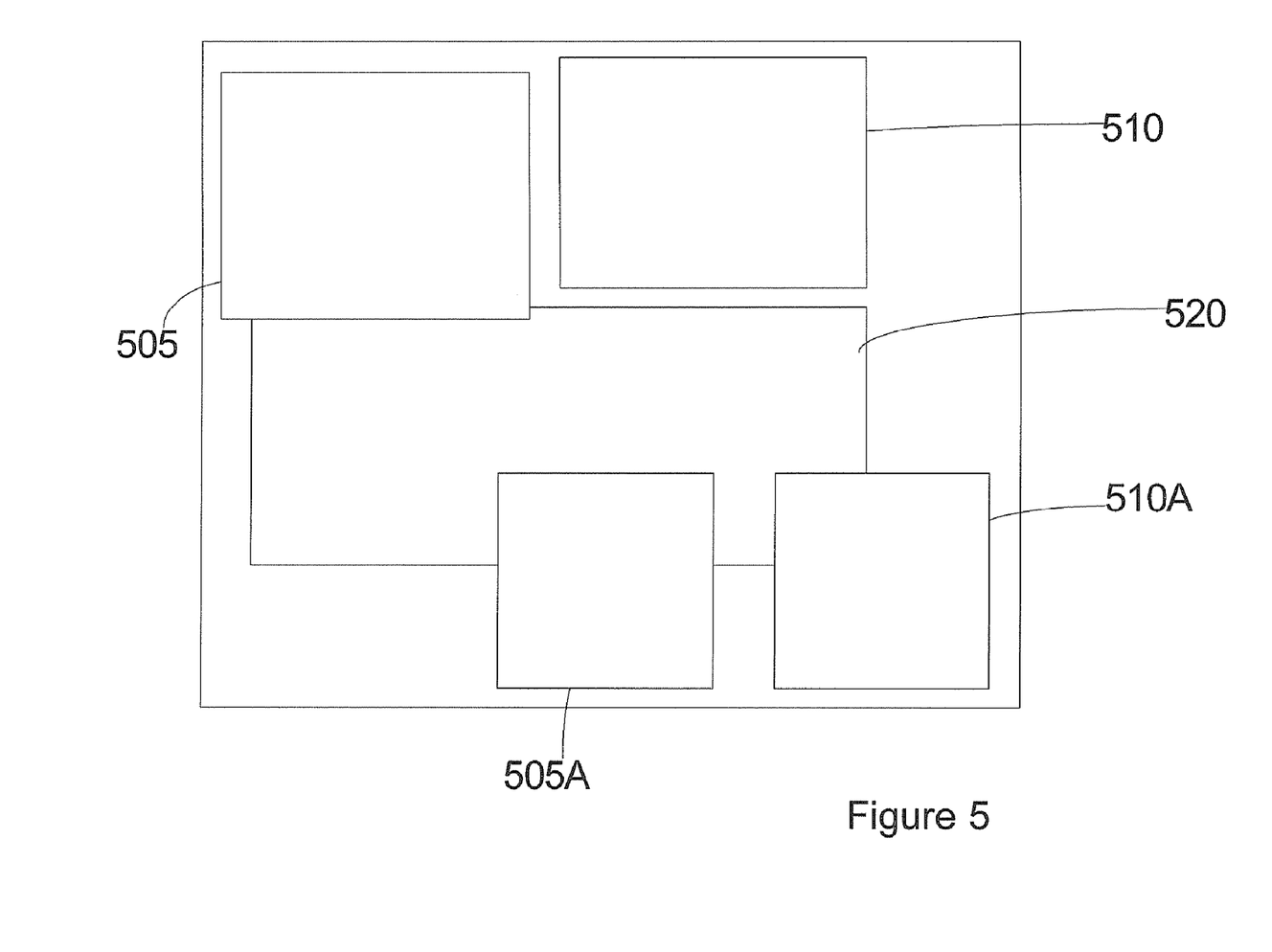
FIG. 5 shows a screenshot from a client device showing operation of a system in accordance with the teaching of the present invention, with two machines connected.

As shown in the screen shot of FIG. 5, the user, having effected the basic set up steps outlined above, can see locally the desktop of the "system under test", that is the system running the Client Target application, the SCV. When the user applies mouse/pointer or keyboard actions; on the viewer window, the system under test, the SCT, reacts to the input as appropriate. Within the SCV the user can see two other windows also; a log window 520 and the loupe window 505A, 510A. The log window 520 displays information captured from the system under test desktop window, such as mouse location coordinates, mouse action (single click, double click, etc.) and coordinates, or keyboard input. The loupe window displays the region of the screen visible around the mouse on the system under test, and updates this information at the refresh rate. If there is only 1 SCT, it is by default the "controller", then the user is controlling that system via the SCV—see FIG. 5. If there is more than 1 SCT, then 1 controller is specified by the user, and it is this that is manipulated by the user. The other SCTs use the same user input as the controller receives, that is mouse and keyboard. The dimensions of the loupe window are user defined. The loupe window is not critical to the functioning of the application and shows only a subset of the entire screen, much like the MS Magnifier, which shows an area of the screen around the mouse, as part of its accessibility options. The mouse position, that is screen coordinates (x,y), and mouse action, that is a click or double click, are passed from the SCV to the SDS. In similar fashion, other user actions such as keyboard actions are passed from the SCV to the SDS. The SDS passes the information to the SCT, which in turn passes the message to its operating system queue. When the operating system queue processes the message, it sends the mouse to the appropriate coordinates and applies the action. The refresh action is acting concurrently and independently of user interaction. The stored screenshots however are taken at times prompted by user interaction.

While this is useful to determine how a single system under test operates, the present invention can be extended to apply to multiple systems under test concurrently. In this mode of operation, the user can see the desktop of the "systems under test", that is the systems running the SCT application, and selects any one of them as the "Controller". There should be no reason why one machine is favoured over another. In fact as part of the setup requirements, typically each machine capable of being used as an SUT should be identical in both hardware and software setup. However it will be appreciated that the SDS and the SCV do not have to be of identical specification; either to each other or the SCT, the system under test. By nominating one of the SCTs as the controller the remaining SCTs adopt a default configuration as "followers", mimicking exactly what happens in the controller window. The user can see each desktop of the test systems in separate windows within the SCV. When the user moves the mouse and applies single or double clicks, or the user types text on the "Controller" viewer window, all of the systems under test react to the input as appropriate. Each window displaying the desktop of a "follower" system mimics the actions exactly that are being applied to the Controller window.

At any time the user may choose to decouple the systems under test from the Controller system. They can perform this decoupling by selecting the menu item "Set No Controller". Each window becomes available for user interaction individually. In fact even when there is a controller set, the user can still manipulate each individual machine by selecting the appropriate window in the SCV and interacting with it directly.

Within the SCV, the user can see two other windows for each desktop window, they are; the log window and the loupe window. The log window displays information captured from the system under test desktop window, such as mouse location coordinates, mouse action (single click, double click) and coordinates, or keyboard input. The loupe window displays the region of the screen visible around the mouse on the system under test, and updates this information at the refresh rate. There are two options to deal with crowding on the desktop, the first involves scaling the windows which display the systems under test, and relying on the loupe images for the respective machines to test the systems. The second solution is to use a multi-monitor video card on the machine running the client viewer software, which increases the desktop space to 2, 4, 8 monitors. Dual Monitor cards are common, eg. ATI and nVidia provide these, Matrox provide a quad graphics card and Xentera GT8 PCI 8 provide a card that supports 8 monitors on once computer.

While it is useful to interact with many remote computers simultaneously and to monitor how actions on one computer translate into activity on that or other computers so as to ensure identical behaviour responses, it is also possible using the techniques of the present invention to provide for a recordal of scripts. This recordal is useful for a number of reasons including the situation where, for example, it is desired to execute a certain activity at a first instance in time and re-execute that identical activity at a later time period on the same or different computer so as to ensure the same behaviour. Other reasons why scripts may be recorded include: for training and demonstration purposes (product walkthroughs) or for taking screenshots of a changing UI for help systems or documentation.

Following the setup outlined above for mimic 1-Many (where the number of systems can be greater than or equal to 1), the "Controller" system is chosen. To begin recording, the user selects a record menu option. The user then follows the test case steps, and when complete, selects the "Stop record" menu item. In many ways, this is similar to recording a macro in Visual Basic or the like. The format of the recorded script is XML and it is saved on the SDS by default. There will be one script recorded for each SCT. The reason for this is that the SCTs could be running different platforms and there could be slight differences in the recorded scripts. Further, at some point in the recording process the user may wish to apply some particular input to only some of the machines under test.

A script item record could look like:

```
<Snapshot>
    <MouseButton>
        <Action>MOVE</Action>
        <XPos>7488</XPos>
        <YPos>21333</YPos>
        <EventTimeSeconds>0</EventTimeSeconds>
        <EventTimeMilliSeconds>15</EventTimeMilliSeconds>
        <PlaybackMode>1</PlaybackMode>
    </MouseButton>
</Snapshot>
```

The above example shows the capture of a mouse move to a position on the screen denoted by coordinates <x, y>:<7488, 21333>. Keyboard input can be captured and put into <Keyboard></Keyboard> tags.

While it is useful to effect the recordal of a script, the main benefit arises where one wants to replay that recorded script at a later juncture in time. This is particularly useful where one wants to automate certain tasks, which can be done by recording a script once and then running it multiple times as desired. In a playback mode each line of a test script is parsed line by line and the actions are then sent to the appropriate SCT for execution. The controller script can be played back on the controller machine in one of two ways: playback as a controller of many SCTs, or playback as itself a stand-alone SCT. During the record process a controller is set and each individual SCT "follows" it. A script is recorded for the controller and each of the SCTs. These scripts are stored on the SDS. The controller script contains information that it is a controller and that there are other SCTs. On playback of the controller script on the controller, it will make the open windows of SCTs, its slaves associated with the script recording. One can effect a playback in a plurality of individual SCTs simultaneously. It is also possible to playback the script of an individual SCT on an individual client target.

When a 1-Many script is recorded, this means the following:

A script is recorded for the controller machine.

Individual scripts are recorded for each Client Target

A script can be played back on any machine. There is nothing special which inextricably links a script to a machine. If the system is deployed in the Mimic mode 1-many and a script is played back on the controller, all of the other SCTs will follow it. A script recorded on one SCT will play on a second SCT. Whether it plays successfully on the second SCT is dependant on the User Interface being identical for both SCT's.

It will be appreciated that heretofore the system of the invention has been described with regard to an implementation where each of the individual computers in the networked architecture are set up so as to mimic the behaviour of one another. By operator visual inspection comparing the reactions of each it is then possible to determine whether each system is performing correctly. The present invention may also be operated in another configuration, that of exact match mode.

In the exact match mode, the 1-1 use of the system is similar to 1-1 mimic mode, with the addition that, every time a user interaction takes place, a screenshot is taken of the area surrounding the mouse. We use an area centred on the mouse of 'nxm' pixels as a feature allowing the identification of the location where the user interaction takes place. In mimic mode, the exact coordinates of the mouse and location of the cursor are passed to the Client Target, via the Dispatch Server. In Shadow mode, this information is supplemented with a graphic, the query image, which is stored on the Dispatch Server. The information in the graphic is not used during Live 1-1 usage but is used during Live 1-Many Shadow usage and also during playback of a recorded script. If the system is executed in this mode, every time a user interacts with the system under test, a graphic is generated and stored on the dispatch server.

The benefit of this storage of individual graphics associated with each control sequence is evident in a playback configuration, and more particularly in playback configuration where a recorded script is replayed on a system that is physically different (physical differences can include but are not limited to user interface layout changes and screen resolution changes) from but which should be configured identically to the original system which served for the recordal.

Exact Match mode may be considered a proper subset of Shadow Mode.

The sequence of events when a user sends input to a controlling SCT in Shadow Mode is:

User applies input to controlling SCT.
SCV generates query image information for this input.
User input and query image information are sent by SCV to SDS.
For each non-controlling SCT the SDS requests a screenshot.
Non-controlling SCT returns a screenshot to SDS.
SDS sends SCT screenshot together with query image and supporting information to the SIS.
SIS attempts to find user input screen co-ordinates based on the input that the SIS received from the SDS. This could be an exact match or an acceptable match.
If the SIS finds unique co-ordinates then the SIS sends the found co-ordinates to the SDS and the SDS in turn sends these co-ordinates to the SCT. SIS may also return widget text to the SDS.
SCT puts the coordinate and command information into the operating system message queue so that the user interaction can take place at the correct location.
If unique co-ordinates are not found then the SIS requests the SDS for further supporting information. The SDS requests the SCV for further supporting information which the SCV returns. The SDS sends this new supporting information to the SIS and the finding process is repeated. The SCV may also send back a response to cancel this input.
The user input from the controlling SCT is sent to the SCT in exactly the same manner as in mimic mode.

During the playback, the following steps are conducted by the Client Viewer:

Script item is read.
Script item is parsed for the action.
Script item is parsed for the query image graphic name and supporting information. Supporting information can include text appearing on the widget.
SDS performs lookup on the translation memory database to see if there is a translation for the widget text.
SCT is asked for a screenshot, through the SDS.
SCT returns a screenshot to SDS.
SDS returns the screenshot to SIS along with query image and supporting information.
SIS attempts to find if screenshot contains an acceptable match for the query image graphic.
If an acceptable match is found then the SIS sends the found coordinates to the SDS and the SDS in turn sends these to the SCT.
SCT puts this information into the operating system message queue so that the user interaction can take place at the correct location.
If an acceptable match is not found then the SCV will do one of (i) stop playback, putting an error flag in the log; (ii) attempt to supply further supporting information automatically or (iii) request the user for supporting information.

Analysis is only being performed currently on the SCT and will be a function of the Interpretation Server. This exact match mode is useful for automated testing and included amongst the reasons why exact match mode is superior to mimic mode are:

Applications or widgets can appear at different locations each time they are instantiated. A mimic mode script cannot cater for the situation where the application is functioning perfectly but the feature are not located where they are expected.
It is easy to get applications that take up the whole screen to be located in the same place each time they are instantiated, such as many multimedia applications. It is not easy to get all other types of application running on many machines at the same time to be located at the same position each time they are used. Mimic mode expects that applications are immutable each time they are run on different systems. Exact match mode can cater for differences across systems and is superior in this respect.
As we are interrogating the user interface for an exact match synchronisation issues in playback mode are less likely to occur.

Failures occur in Exact Match mode in a similar way to Mimic mode and include reasons such as:

Operating system failing
Application failing
Script synchronisation failure

When the Client Target cannot find the widget of interest on the screen to which to apply an action, Script synchronisation failure occurs, this may be due to:

1. the widget is non-unique—and there are many exact match locations.
2. the widget being non-existent—and there are no exact match locations.

In case 1 where the widget is non-unique, this could be due to a bug or it could be a legitimate occurrence. In either case the user will be flagged that an issue has arisen. The user will be asked to intervene, and specify some piece of information (screen area) which is sufficient to make the widget unique, or specify that this is indeed an error. The script will either proceed in the former case or log a fail in the latter.

In case 2 where a widget does not exist, then a fail will be logged automatically.

The "timely manner" is translated into an objective timescale through heuristics gauged from the system processor speed, memory and supplementary information on how long the task took to complete on another system (that is when the script was recorded). There are no timing issues when a script is being recorded, as the user has all of the visual cues necessary and will only provide input when prompted to do so by the application.

The invention has heretofore being described with reference to two exemplary mode of application; mimic and exact match. It will now be described with reference to a preferred mode of operation, shadow mode. In this mode of operation the system outlined in FIG. 1 is expanded to include the SIS, an interpretation server module that interfaces with the dispatch server module and also communicates within the network context using the TCP/IP protocol. The interpretation server module operates by taking a recorded test case script and to go through it record by record in an automatic fashion. For each record it parses the name of the screenshot and the coordinates at which the user interaction took place. The interpretation server module then opens the screenshot in question and applies a variety of image processing techniques to segment the image into regions. Feature vectors are extracted from each region at the SIS and then used to identify objects from a database. It will be appreciated that the database is previously user populated in that the user will have to populate the database for each type of widget capable of being recognised with exemplars. The database is populated using manually provided exemplars taken from the operating system under test. A manual process of taking screenshots and manually segmenting the images into objects is performed. The database is populated with these objects for example using BLOB—binary large object database technology. The object level description of the image, fuzzy logic and the geometry of the objects; and an XML framework may be used to describe the image. More immediately the object level description of the image allows an identification of the widget that appears at the coordinates in the test case record. Using the information from the test case script, the following information is available:

User action.
Coordinates in the screenshot at which the interaction occurred.
Context of the user action.

What is not known is; on what widget (object) did the user click? Using the object level description of the image provided by the interpretation server module, the user action and the identity of the object at the given coordinates provides the necessary context to playback the script. Another application using the functionality available through the use of the interpretation server module is the ability to convert the recorded actions through the interpretation server into an "English" version of the test script. This is often required for distribution to other members of a test organisation outside the immediate testing team.

For a playback mode it is possible to pose the opposite question; "Where is a given widget in the image?" It is possible to take an image from the playback and the coordinates at which the user interaction occurred and identify the location of a widget. How the widget is found will depend on the mode the user is operating in, i.e. Exact match mode or Shadow mode.

In more mathematical language the interpretation server module performs two functions;
1. the first is to identify the widget at location with (x,y) coordinates; and
2. the second is to find the (x,y) coordinates of a given widget.

Which may be expressed as:
1. Object findwidget(point p) {return Object widget}
2. point findCoordinates(Object widget) {return point p}

Using the architecture of the invention it is possible to enable a single tester to test multiple machines simultaneously. As all communications between the controller machine running SCV and the systems under test SCTs, is effected through the dispatch server, SDS, which translates the commands received into a syntax and format necessary to implementation in the system under test it is possible to interface with systems of many different operating systems simultaneously. When running in a mimic mode or Exact match mode or Shadow mode, essentially the user is able to pass keyboard and mouse actions simultaneously (pseudo) to all target machines.

A system in accordance with the teaching of the invention enables the taking of repetitive tasks which are carried out in a serial fashion and parallelise them. This innovation has immediate benefits with respect to quality assurance (QA) and some aspects of screenshooting and post-production, and DTP (Desktop publishing—including graphics for manuals and so on.)

By interfacing with and visualising the performance of multiple SCTs simultaneously it is possible to speed up manual testing significantly, even when there is no image interpretation of the user interface under test.

As will be appreciated the invention has been described with reference to exemplary components of a network architecture useful for an understanding of the invention. It is not intended that these exemplary embodiments be considered limiting as they are provided to explain the operation of the invention and the scope is to be construed only as limited in the light of the appended claims. Each of the client viewer module SCV and client target module SCT are provided on distinct and separate computers within the network. Although it is preferable for the dispatch server module SDS and interpretation server module SIS to be provided on distinct machines so that they may enjoy the benefit of their own dedicated processor, certain applications may be employed where one or more of the server modules and the client viewer module are co-resident on a single machine. Communication between each of the modules is desirably effected using the TCP/IP protocol. When referring to computers/machines there is also a complimentary technology VMWare which allows one machine (the host computer) to run multiple operating systems simultaneously (guest operating systems). These operating systems will appear as separate computers on the network which is sometimes also referred to as virtualisation of computers.

The Client Viewer is configured to enable a display of the desktop of the system(s) running the Client Target module. If there is more than one system under test, there will be one window set in the Client Viewer for each machine. Screenshots of the whole desktop of the Client Target are compressed on the SDT and sent via TCP/IP to the Dispatch Server. The Dispatch Server sends the compressed screenshots to the Client Viewer, while retaining a copy. The Client Viewer un-compresses and displays the screenshot. The refresh rate, that is the number of screenshots sent by the Client Target to the Client Viewer (via the Dispatch Server), is by default approximately 5 frames/second, and can be changed by the user. The refresh rate relates only to screenshots sent to the Client Viewer. There is a separate stream of screenshots taken at different times and prompted by user interaction. Once the machines are connected the user interacts only with the Client Viewer, which then conveys the instructions keyed at the client viewer via the dispatch server to the client target. In this way the communication traffic during a session is minimized to the specific keystrokes/mouse actions that are conducted for each interaction. As there is much less traffic the bandwidth usage is minimized and also the speed of data transfer is increased so that actions taken at a first instant in time on a client viewer are acted upon pseudo real time on the client target.

Furthermore, using a system in accordance with the teachings of the present invention it is possible for a user operating a system with an English interface to test other systems operating in different language interfaces. This simultaneous control of system using different languages has evident localisation benefit. In order to provide such functionality the system is operated in the previously mentioned "Shadow mode". It is the characteristic of some widgets that their main identifying feature is text. It is also the case that in order to find widgets equivalent to those bearing English text, on a localised operating system, it is necessary to have some translation mechanism in the system. The database 120A on the SIS 120 is populated with the contents of the translation memory for each language to be used by the system. When a screenshot of the controller SCT is taken during playback of a script, or during live mode, it is sent to the SIS for processing. The SIS as well as identifying the widget (as described previously) can also identify the text associated with it, using OCR.

The SIS supplies the SDS with the found widget information. The SDS queries the translation memory database for the translation of the widget text. The translation memory returns the translated text. The SDS requests the localised SCT for a screenshot. The localised SCT returns a screenshot graphic to the SDS. The SDS supplies the SIS with the localised screenshot graphic and the localised widget text information to be found in the target image. The SIS attempts to return the coordinates of the appropriate localised widget upon which to take the user action.

The addition of OCR supplements functionality of the SDS. The text that is found on a widget has to be looked up in a database of software strings to find its counterpart in the localised system. The SDS does this lookup. The widget text and the translation is stored in the XML script as supporting information. On either playback or live mode, the SIS is supplied with a localised graphic and the localised text to find on it, and it supplies back the location of the match.

It will be noted that this specific example of the utility of the system of the present invention has evident application in localisation—the process of adapting a product or service to a particular language, culture, and desired local "look-and-feel." Ideally, a product or service is developed so that localisation is relatively easy to achieve, that is the product is "enabled for localisation"—for example, by creating resources in software so that the text can easily be changed to another language and allowing some expansion room for this purpose. Translation memory is a piece of technology used in the localization industry. It is a data structure that provides a list of all of the text to be translated, alongside the equivalent translations. It provides a method by which text can be mechanically translated. At first the data structure has to be populated by a translator providing a translation for each element of the translation memory. When the text is updated with additional new content some time later, the translations provided earlier can be mechanically recovered and reused. Such translation data structure may be imported into the SIS and utilised in the context of the present invention.

While the invention has been described with reference to specific embodiments and applications it will be appreciated that these are provided as examples of the operation of the system of the present invention and it is not intended to limit the invention to any one set of examples. Also it will be understood that where components and features are described with reference to one exemplary mode of operation that such components and features could be readily interfaced and used with other exemplary modes of operation. Therefore each example of operation that has been described is not to be considered a stand-alone example as deployments or utilisations of the system of the invention may involve features or components from different examples in architectures not explicitly described herein.

The words comprises/comprising when used in this specification are to specify the presence of stated features, integers, steps or components but does not preclude the presence or addition of one or more other features, integers, steps, components or groups thereof.

The invention claimed is:

1. A system comprising:
a viewer device configured to enable simultaneous control of a plurality of target computing devices from a single viewer computing device,
the viewer device having a display and being configured to generate a plurality of graphical windows on the display, the viewer device being configured to be in direct communication with, a server device, the server device being configured to be in direct communication with each of,
a plurality of client target devices, each of the plurality of target devices being configured to receive input commands from the server device and each of the plurality of target devices being configured to generate display information for forwarding to the server device,
wherein the server device is configured to receive an input effected in one of the graphical windows of the viewer device and to replicate this input so as to provide input commands to each of the target devices and is further configured to receive the display information from the target devices resultant from the input command and relay this information for each target device to the viewer device for display as a separate window on the viewer device, and
the system further including an interpretation device, the interpretation device being coupled to a database having stored therein a plurality of user predefined records, the interpretation device being configured to be in communication with the server device and being configured to receive the commands relayed from the viewer device and to provide digital image processing and database look up operations on those commands so as to interpret those commands for subsequent execution on each of the target devices.

2. The system as claimed in claim 1 wherein the communication between the server device and each of the target devices is through a dedicated data socket.

3. The system as claimed in claim 2 wherein the server device has two data sockets for each target device; one socket configured for communication with the target device and one socket configured for communication with the viewer device.

4. The system as claimed in claim 3 wherein each data socket is bidirectional.

5. The system as claimed in claim 1 wherein commands relayed by the server device to each of the target devices include at least one of:
 a keyboard input and supporting data,
 a mouse/pointer input and supporting data,
 a request for information about the SCT hardware setup,
 a request for a screenshot to be taken,
 a request to retrieve clipboard contents, or
 a request to insert data into clipboard.

6. The system as claimed in claim 1 wherein the communications between the devices is effected through socket connections.

7. The system as claimed in claim 6 wherein each of the devices have running thereon a multi-thread software application.

8. The system as claimed in claim 7 wherein the multi-thread software applications provide a single thread for each socket connection between the viewer device and the server device corresponding with a specific target device.

9. The system as claimed in claim 7 wherein the multi-thread software applications provide a single thread for each socket connection between each target device and the server device.

10. The system as claimed in claim 1 wherein the interpretation device is configured to perform image segmentation and image process commands received from the viewer device.

11. The system as claimed in claim 10 wherein the interpretation device is configured to provide for optical character recognition (OCR) on commands received from the viewer device so as to define recognised characters resultant from images received from the viewer device.

12. The system as claimed in claim 11 wherein the viewer device and at least one of the client target devices provide displays in different language, the server device being configured to effect a translation of the recognised characters from the viewer device into a language appropriate for the target device, the translated characters being used to effect a corresponding command on the target device.

13. The system as claimed claim 1 being configured to operate in a mimic mode, operation of the mimic mode enabling a user at the viewer device to select one of the displayed windows at the viewer device as a controller window, with commands effected in that window being replicated across each of the client target devices and the results of those commands at each of the client target devices being displayed in specific others of the displayed windows on the viewer device, each of the specific others of the displayed windows being uniquely associated with a specific client target device.

14. The system as claimed in claim 13 wherein a plurality of commands are provided, the commands provided in the form of a script, the scripts being recorded at a first instance in time and being re-playable at a later user defined instant in time.

15. The system as claimed in claim 13, being further configured, on execution of a command in the controller, of effecting the step of recording a graphic of an area surrounding that command, the graphic being generated and stored for each interaction between the user and the controller window, and being storable at the server device.

16. The system as claimed in claim 14 being further configured, on execution of a command in the controller, of effecting the step of recording a graphic of an area surrounding that command, the graphic being generated and stored for each interaction between the user and the controller window, and being storable at the server device and wherein the system further includes an interpretation device, the interpretation device being configured during playback of the script to compare the images resultant from an execution of the commands at each of the target devices with the images resultant from the original recordal of the script.

17. The system as claimed in claim 16 wherein the interpretation device is configured, on determining that a match exists between the images resultant from the original recordal of the script and the images resultant from execution of the script, of effecting a display at the client device of a successful execution of the script.

18. The system as claimed in claim 15 further including an interpretation device, the interpretation device being configured to use the images resultant from an execution of a command at the controlling device to determine the screen coordinates for user input on the target devices.

19. The system as claimed in claim 13 being further configured, on execution of a command in the controller, of effecting the step of recording a graphic of an area surrounding that command, the graphic being generated and stored for each interaction between the user and the controller window, the system further including an interpretation device, the interpretation device being configured to provide an analysis of the graphics associated with each command executed on the controller window and determining an appropriate command for execution on each of the target devices.

20. The system as claimed in claim 19, wherein the determination of an appropriate command includes the step of determining an equivalent region in the window associated with each target device for application of the command executed in the controller window.

21. The system as claimed in claim 20 wherein the determination of an equivalent region is effected by performance of an optical character recognition (OCR) function on the window of the target device.

22. A computer implemented method for enabling simultaneous control of a plurality of target computing devices, the method including the steps of:
 simultaneously controlling the plurality of target computing devices from a viewer device,
  providing a first software module, the first software module being executable on the viewer device having a display, the first software module being configured to generate a plurality of graphical windows on the display,
 providing a second software module, the second software module being executable on a server device and providing for communication interface between the viewer device and a plurality of client target devices,
 providing a third software module, the third software module being executable on one or more of the plurality of client target devices, the second target module configured to enable each of the plurality of client target devices on which it is executing to receive input commands from the server device and to generate display information for forwarding to the server device, wherein execution of, and interface between, each of the three software modules provides for the transmission of an command effected in one of the graphical windows of the viewer device through the server device for replication at each of the target devices and for generation of display information from the target devices resultant from the command and a relay of this information for each target device to the viewer device via the server device for display as a separate window on the viewer device to confirm replication of the command, and providing an interpretation software module being executable on an interpretation device configured to be coupled to a database having stored therein a plurality of user predefined records, the interpretation device being configured to be in communication with the server device and being configured to receive commands relayed from the viewer device and to provide digital image processing and database look-up operations on those commands for subsequent execution on each of the target devices.

23. A computer program having a plurality of individual modules which when run on one or more computing devices are configured to carry out the method steps of claim 22.

* * * * *